US008952089B2

(12) United States Patent
Guymon et al.

(10) Patent No.: US 8,952,089 B2
(45) Date of Patent: Feb. 10, 2015

(54) SYSTEMS AND METHODS FOR PROVIDING A THERMOPLASTIC PRODUCT THAT INCLUDES PACKAGING THEREFOR

(71) Applicants: Michael P. Guymon, Ogden, UT (US); Ted E. Maxwell, Centerville, UT (US); Ken W. Maxwell, Sandy, UT (US)

(72) Inventors: Michael P. Guymon, Ogden, UT (US); Ted E. Maxwell, Centerville, UT (US); Ken W. Maxwell, Sandy, UT (US)

(73) Assignee: Maxwell Products, Inc., Salt Lake City, UT (US)

( * ) Notice: Subject to any disclaimer, the term of this patent is extended or adjusted under 35 U.S.C. 154(b) by 0 days.

(21) Appl. No.: 13/647,293

(22) Filed: Oct. 8, 2012

(65) Prior Publication Data
US 2013/0273272 A1 Oct. 17, 2013

Related U.S. Application Data

(63) Continuation of application No. 13/102,380, filed on May 6, 2011, now Pat. No. 8,283,409, which is a continuation of application No. 11/731,816, filed on Mar. 29, 2007, now Pat. No. 8,017,681.

(60) Provisional application No. 60/787,607, filed on Mar. 30, 2006.

(51) Int. Cl.
| | |
|---|---|
| *A61K 9/16* | (2006.01) |
| *C08L 95/00* | (2006.01) |
| *C08F 297/02* | (2006.01) |
| *C08L 25/00* | (2006.01) |
| *B65D 85/84* | (2006.01) |
| *B32B 1/02* | (2006.01) |
| *B65D 21/02* | (2006.01) |
| *B65D 65/46* | (2006.01) |

(Continued)

(52) U.S. Cl.
CPC .............. *B32B 1/02* (2013.01); *B65D 21/0223* (2013.01); *C08L 95/00* (2013.01); *B65D 65/46* (2013.01); *B65D 71/0096* (2013.01); *C09D 195/00* (2013.01); *C09J 195/00* (2013.01); *C08L 53/02* (2013.01); *B65D 2571/00061* (2013.01); *B65D 2571/00086* (2013.01)
USPC ........... 524/543; 524/59; 524/577; 206/524.7

(58) Field of Classification Search
USPC .......................... 524/543, 59, 577; 206/524.7
See application file for complete search history.

(56) References Cited

U.S. PATENT DOCUMENTS

| | | |
|---|---|---|
| 2,862,616 A | 7/1958 | Capozzi et al. |
| 4,092,282 A | 5/1978 | Callan |

(Continued)

FOREIGN PATENT DOCUMENTS

| | | |
|---|---|---|
| WO | WO 99/30973 A1 | 6/1999 |
| WO | WO 00/55280 A1 | 9/2000 |

(Continued)

*Primary Examiner* — Angela C Scott
(74) *Attorney, Agent, or Firm* — David B. Tingey; Bryant J. Keller; Kirton McConkie

(57) ABSTRACT

Systems and methods for providing a thermoplastic product that includes packaging therefore. Implementation of the present invention takes place in association with packaging of one or more ingredients of a thermoplastic product, wherein the packaging is used to contain the ingredients during storage and/or transportation, and wherein at least a portion of the packaging itself is an ingredient for inclusion into the thermoplastic product. In some implementations, the entire packaging is incorporated into the thermoplastic product for utilization thereof.

20 Claims, 11 Drawing Sheets

(51) Int. Cl.
*B65D 71/00* (2006.01)
*C09D 195/00* (2006.01)
*C09J 195/00* (2006.01)
*C08L 53/02* (2006.01)

(56) References Cited

U.S. PATENT DOCUMENTS

| | | | |
|---|---|---|---|
| 4,190,156 A | 2/1980 | Adam | |
| 4,310,446 A | 1/1982 | Gaus et al. | |
| 4,334,615 A | 6/1982 | Butler et al. | |
| 4,443,578 A | 4/1984 | Frier | |
| 4,818,367 A | 4/1989 | Winkler | |
| 4,978,825 A | 12/1990 | Schmidt et al. | |
| 5,110,641 A | 5/1992 | Kean | |
| 5,160,686 A | 11/1992 | Thaler et al. | |
| 5,223,032 A | 6/1993 | Gaudio et al. | |
| 5,257,491 A | 11/1993 | Rouyer et al. | |
| 5,278,207 A | 1/1994 | Kluttz | |
| 5,322,867 A | 6/1994 | Kluttz | |
| 5,339,975 A | 8/1994 | Stoner | |
| 5,392,592 A | 2/1995 | Bozich et al. | |
| 5,397,530 A | 3/1995 | Narasimhan et al. | |
| 5,451,619 A | 9/1995 | Kluttz et al. | |
| 5,452,800 A | 9/1995 | Muir | |
| 5,494,510 A | 2/1996 | Kuc, Sr. | |
| H1580 H | 8/1996 | Kluttz | |
| 5,543,211 A | 8/1996 | Gallagher et al. | |
| 5,576,363 A | 11/1996 | Gallagher et al. | |
| 5,624,594 A | 4/1997 | Matsen et al. | |
| 5,712,033 A | 1/1998 | Gallagher et al. | |
| 5,718,752 A | 2/1998 | Kluttz | |
| 5,723,844 A | 3/1998 | Dow et al. | |
| 5,733,616 A | 3/1998 | Janicki et al. | |
| 5,765,686 A | 6/1998 | Wright et al. | |
| RE36,177 E | 4/1999 | Rouyer et al. | |
| 5,897,951 A | 4/1999 | Gallagher et al. | |
| 5,911,817 A | 6/1999 | Hayner | |
| 5,989,662 A * | 11/1999 | Janicki et al. | 428/35.7 |
| 5,992,628 A | 11/1999 | Vermilion et al. | |
| 6,067,776 A | 5/2000 | Heuer et al. | |
| 6,102,613 A | 8/2000 | Medico, Jr. et al. | |
| 6,107,373 A | 8/2000 | Janicki et al. | |
| 6,155,029 A | 12/2000 | Jain | |
| 6,206,607 B1 | 3/2001 | Medico, Jr. et al. | |
| 6,230,890 B1 | 5/2001 | Waver et al. | |
| 6,362,257 B1 | 3/2002 | Chehovits et al. | |
| 6,966,723 B2 | 11/2005 | Zentner | |
| 7,994,244 B2 | 8/2011 | Binkley | |
| 8,017,681 B2 | 9/2011 | Guymon et al. | |
| 8,162,059 B2 | 4/2012 | Nguyen et al. | |
| 8,283,409 B2 | 10/2012 | Guymon et al. | |
| 2003/0091389 A1* | 5/2003 | Zentner | 404/17 |
| 2003/0155261 A1 | 8/2003 | Paul et al. | |
| 2007/0027235 A1 | 2/2007 | Marchal | |
| 2007/0231545 A1 | 10/2007 | Ruan | |
| 2008/0118689 A1 | 5/2008 | Mehta et al. | |
| 2008/0190326 A1 | 8/2008 | Fields | |
| 2010/0210745 A1 | 8/2010 | McDaniel et al. | |
| 2011/0121222 A1 | 5/2011 | Guymon et al. | |
| 2011/0294927 A1 | 12/2011 | Williams et al. | |
| 2013/0075298 A1* | 3/2013 | Chehovits et al. | 206/524.7 |

FOREIGN PATENT DOCUMENTS

WO   WO 2004/096917 A1   11/2004
WO   WO 2007/124237 A1   11/2007

* cited by examiner

SYSTEMS AND METHODS FOR PROVIDING A THERMOPLASTIC PRODUCT THAT INCLUDES PACKAGING THEREFOR

RELATED APPLICATIONS

This application is a continuation of U.S. patent application Ser. No. 13/102,380 filed May 6, 2011, entitled "SYSTEMS AND METHODS FOR PROVIDING A THERMOPLASTIC PRODUCT THAT INCLUDES PACKAGING THEREFOR", which is a continuation of U.S. patent application Ser. No. 11/731,816 filed Mar. 29, 2007, entitled "SYSTEMS AND METHODS FOR PROVIDING A THERMOPLASTIC PRODUCT THAT INCLUDES PACKAGING THEREFOR", which claims priority to U.S. Provisional Patent Application Ser. No. 60/787,607 filed Mar. 30, 2006, entitled SYSTEMS AND METHODS FOR PROVIDING SEALANT AND PACKAGING THEREFOR, which are all incorporated herein by reference in their entirety.

BACKGROUND OF THE INVENTION

1. Field of the Invention

The present invention relates to thermoplastic products. In particular, the present invention relates to systems and methods for providing a thermoplastic product that includes packaging therefor, wherein the packaging is used to contain one or more ingredients of the thermoplastic product during storage and/or transportation, and wherein the packaging itself is an ingredient for inclusion into the thermoplastic product.

2. Background and Related Art

While techniques currently exist relating to pavement joint sealants, pavement crack sealants, waterproofing membranes, hot melt adhesives, roofing asphalt, paving grade asphalt cement, challenges exist.

Upon manufacturing pavement joint or crack sealants, waterproofing membranes, or hot melt adhesives, the sealants, membranes or adhesives are typically pumped or poured into plastic bag lined cardboard boxes at temperatures lower than the melting point of the plastic bag liners, then are stacked on pallets for cooling, storage and shipment. When the sealants, membranes, or adhesives are applied, they may be used to minimize water infiltration, prevent the accumulation of debris, and prolong the life of a material or structure. Examples of such materials include asphalt pavement and portland cement pavement. Examples of such structures include roads, roofs, bridge decks, retention ponds, etc. Application of the sealants, waterproofing membranes, or hot melt adhesives typically requires heating and mixing at application temperatures.

Challenges exist in using plastic bag lined cardboard boxes for products, such as packaging sealants, waterproofing membranes, or hot melt adhesives. For example, prior to application of the products, if the cardboard boxes are exposed to water, the structural integrity of the cardboard boxes is compromised. When the integrity of the box is compromised, the plastic bag liner can also become compromised. Moreover, the product can escape from the storage boxes and become unusable, which may not only become a waste of the product but also an unsightly pile at the storage or job site. In addition, whenever the product sticks to another material, including the storage container, it can require a very time consuming and arduous task to eliminate the foreign material from the product and can even cause the product to become unusable.

Challenges also exist in the roofing asphalt industry. Upon manufacturing roofing asphalt, the roofing asphalt is typically poured into silicone coated paper containers or roofing plugs at high temperatures and allowed to solidify when cooled. The filled roofing plugs are typically about 100 pounds each, and can prove difficult and potentially hazardous to handle. In order to use the roofing plug, the paper packaging needs to be peeled from the plug, leaving a large and unwieldy piece of roofing plug, which is difficult to handle and can cause injury to operators. There is also a risk of dropping or mishandling the roofing plug when placing it into the roofing asphalt melter, causing hot asphalt to splash onto the operator, causing serious burns. Challenges exist in shipping this type of container in warm weather conditions, as the paper containers can become compromised when exposed to water. The roofing asphalt softens in summer weather and can flow or otherwise escape from the compromised containers, which may not only become a waste of the roofing asphalt but also an unsightly pile at the storage or job site. In addition, whenever the roofing asphalt sticks to another material, it can require a very time consuming and arduous task to eliminate the foreign material from the roofing asphalt and can even cause the roofing asphalt to become unusable.

Challenges also exist relating to paving grade asphalt cement. In some markets, paving grade asphalt cement is shipped in metal containers, such as 55 gallon metal drums. The metal drums pose an environmental challenge to customers because they cannot be economically returned to the manufacturer, nor can they be easily recycled or reused in remote areas because they are contaminated with asphalt and/or the recycling facilities are not within economical shipping distance.

Thus, while techniques currently exist relating to pavement joint sealants, pavement crack sealants, waterproofing membranes, hot melt adhesives, roofing asphalt, paving grade asphalt cement, challenges exist. Accordingly, it would be an improvement in the art to augment or even replace current techniques with other techniques.

SUMMARY OF THE INVENTION

The present invention relates to thermoplastic products. In particular, the present invention relates to systems and methods for providing a thermoplastic product that includes packaging therefor.

Implementation of the present invention takes place in association with packaging of one or more ingredients of a thermoplastic product, wherein the packaging is used to contain the ingredients during storage and/or transportation, and wherein at least a portion of the packaging itself is an ingredient for inclusion into the thermoplastic product. The packaging may be created using an expanded, formed, blown, extruded, cast, molded, welded and/or other process. In some implementations, the entire packaging is incorporated into the thermoplastic product for utilization thereof.

In at least some implementations, the packaging comprises a durable container that is configured to receive a volume of one or more ingredients. The durable container is used to hold the one or more ingredients during storage and/or transportation, and contributes to the structural stability of an individual container and a stack of containers (i.e., a pallet or partial pallet of containers). In further implementations, the durable container is interlocking with other durable containers, which further contributes to the structural stability of a stack of containers.

In at least some implementations, the durable container comprises a polymer or other material that is pre-calculated to be used as an ingredient in the thermoplastic product mixture or material. Examples of such polymer materials include polystyrene, polypropylene, polyethylene, ethylene vinyl acetate, styrene butadiene styrene block copolymer, styrene butadiene rubber, styrene-ethylene/butylene-styrene block co-polymer, styrene-ethylene/propylene-styrene block co-polymer, styrene isoprene styrene block co-polymer, reactive terpolymers, or another polymer material. In some implementations, the durable container comprises a plastic or plastic foam container which can be thermoplastic itself In some embodiments, the durable container is solid or semi-solid at ambient temperatures, and is heated and mixed with other ingredients to create the thermoplastic product.

Accordingly, at the job site, one or more containers with ingredients therein may be combined to obtain a thermoplastic product for application onto one or more surfaces. Therefore, the applied thermoplastic product includes the container that was used to store and/or transport the ingredients prior to mixture of the thermoplastic product.

In some embodiments, the pallet itself and/or any wrap or other packaging is also included as an ingredient that is combined to obtain the thermoplastic product. Therefore, in some embodiments, the applied thermoplastic product includes all of the packaging, including the container, the pallet and any other packaging that was used to store and/or transport the ingredients prior to mixture of the thermoplastic product.

In at least some implementations, generation of a thermoplastic product for application to a surface includes providing a thermoplastic product ingredient container having a volume of thermoplastic product ingredients; mixing the thermoplastic product ingredient container and the volume of thermoplastic product ingredients to produce a volume of a thermoplastic product; and applying the thermoplastic product mixture to the surface. In at least some implementations, the mixing of the thermoplastic product ingredient container and the volume of thermoplastic product ingredients to produce a volume of a thermoplastic product comprises heating the mixture. In one implementation, the mixture is heated to about 250° F. to 450° F. However, other embodiments embrace other temperature ranges.

While the methods and processes of the present invention have proven to be particularly useful in the area of pavement crack sealants, joint sealants, other sealants, waterproofing membranes, roofing asphalt, paving grade asphalt cement, and hot melt adhesives, those skilled in the art will appreciate that the methods and processes of the present invention can be used in a variety of different applications and in a variety of different areas of manufacture to yield a thermoplastic product for use or application to a surface, wherein the thermoplastic product includes its storage and/or transportation container as an ingredient thereof. Examples include pavement maintenance (e.g., asphalt crack sealants, concrete joint sealants, bridge deck membranes, bridge expansion joint sealants, wide crack sealants, pothole patching products, concrete spall repair products, concrete patching products, paving joint adhesives, traffic loop detector sealants, pavement marker adhesives, colored sealants and products, hot applied rubberized chip seal binders, chip seal binder additives, hot applied seal coats, etc.), roofing (e.g., shingle tab adhesives, shingle lamination adhesives, waterproofing membranes, polymer roofing asphalt, polymer modified bitumen, blown roofing asphalt, planter box membranes, rolled roofing seam adhesives, ice and snow shields, vertical surface adhesives, vertical surface repair, perforation repair, white hot applied waterproofing membranes and top coatings, silver hot applied waterproofing membranes and top coatings, gray hot applied waterproofing membranes and top coatings, etc.), paving (e.g., paving grade asphalt cement, polymer modified paving asphalt cement, paving additives and modifiers, etc.) gaskets, thermoplastic paints, hot melt adhesives, extruded rubber products, pre-weighed polymers, and any process that uses batch inclusion packaging for raw materials.

Embodiments of the present invention embrace a container that reduces the weight of the individual units, is safer to handle, eliminates packaging waste, and provides a waterproof shipping and storage container. Additionally, embodiments of the present invention enable one way shipping, easy handling, improved safety, and environmental compatibility.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to thermoplastic products. In particular, the present invention relates to systems and methods for providing a thermoplastic product that includes packaging therefor. Embodiments of the present invention take place in association with packaging one or more ingredients of a thermoplastic product, wherein the packaging is used to contain the ingredients during storage and/or transportation, and wherein at least a portion of the packaging itself is an ingredient for inclusion into the thermoplastic product. In some implementations, the entire packaging is incorporated into the thermoplastic product for utilization thereof. The packaging may be created using an expanded, formed, molded, injected, injection molded, foam injection molded, expanded bead injection molded, welded, compression molded, but out and/or other process. In one embodiment, the container is created using expanded beads and/or injected products. In another embodiment, the container comprises a fusable filler material. Processes for creating containers In the disclosure and in the claims the term "thermoplastic product" shall include one or more polymeric materials that are solid or semisolid at ambient temperatures and that soften and/or melt when heated. At least some thermoplastic products can be reformed repeatedly without significant change in composition or properties.

Figure 1:
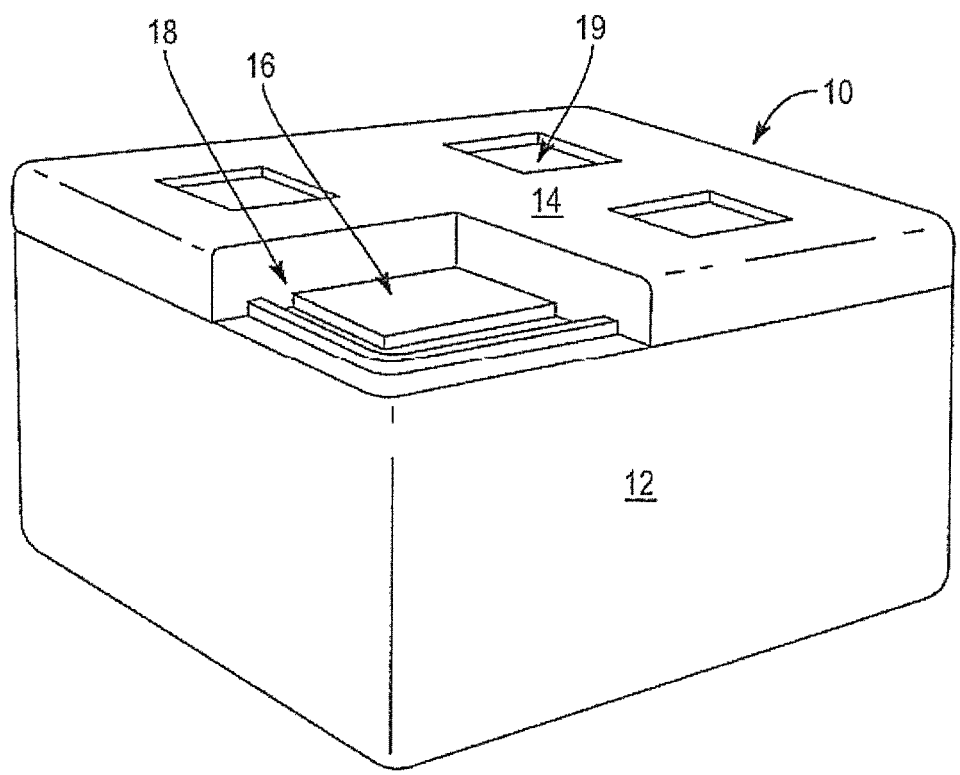
FIG. 1 illustrates a representative embodiment of the present invention that includes one or more ingredients for a thermoplastic product included in a container for storage and/or transportation, and wherein the container itself is an ingredient for inclusion into the thermoplastic product.

With reference now to FIG. 1, a representative embodiment of the present invention is illustrated that includes one or more ingredients for a thermoplastic product included in a container for storage and/or transportation, and wherein the container itself is an ingredient for inclusion into the thermoplastic product. The ingredients in the container can be a homogenous product, a heterogeneous mixture, or specifically measured ingredients that are used along with the container to create a thermoplastic product when combined with the container at, for example, elevated temperatures.

In FIG. 1, a representative thermoplastic ingredient container is illustrated as durable container 10 having a base 12 and lid 14. Base 12 is configured to receive a volume of one or more thermoplastic product ingredients 16. The combination of base 12 and lid 14 protects ingredients 16 from contaminates and the weather. In the illustrated embodiment, portion 18 of lid 14 couples to or otherwise extends into ingredients 16 to maintain lid 14 coupled to base 12.

Accordingly, container 10 is configured to contain a volume of thermoplastic product ingredients and comprises a polymer or other material that is pre-calculated to be used as an ingredient in the applied thermoplastic product mixture or material. Examples of polymer materials include polystyrene, polypropylene, polyethylene, ethylene vinyl acetate, styrene butadiene styrene block copolymers, styrene butadiene rubber or another polymer material. In one embodiment, the packaging is a polymer container, such as a plastic or plastic foam container, which is itself thermoplastic.

In some embodiments, the thermoplastic product ingredient packaging comprises inter-receiving and/or interlocking containers that increase stability when stacked. For example, the embodiment illustrated in FIG. 1 provides a representative container 10 that is configured to be interlocking with other corresponding containers. In particular, top surface of lid 14 includes one or more receiving portions 19 that are configured to receive corresponding protrusions located at a bottom surface of a base of a similar container. In at least some embodiments, the container insulates the ingredients in the container.

While FIG. 1 and the corresponding discussion provide an embodiment of the present invention, those skilled in the art will appreciate that the embodiment is representative only. Accordingly, embodiments of the present invention embrace a variety of materials, shapes, configurations and/or sizes for providing a thermoplastic product that includes packaging therefor, wherein the packaging is used to contain thermoplastic product ingredients during storage and/or transportation, at least a portion of the packaging being incorporated into the thermoplastic product for utilization thereof. In the illustrated embodiment, the packaging (illustrated as container 10) contributes to the structural stability of an individual container and a pallet or partial pallet, as will be further discussed below.

In some embodiments, the container is weather proof, resistant to ozone and/or other free radicals in the atmosphere, resistant to ultra violet light from the sun, compatible with the thermoplastic product, and/or able to undergo a process of being mixed at application temperature into the thermoplastic product. Furthermore, the container resists cracking and/or melting at storage temperatures, resists cracking and/or melting at packaging temperatures, is strong enough to contain the thermoplastic product ingredients, and/or is able to maintain structural soundness during storage and transportation.

Figure 2:
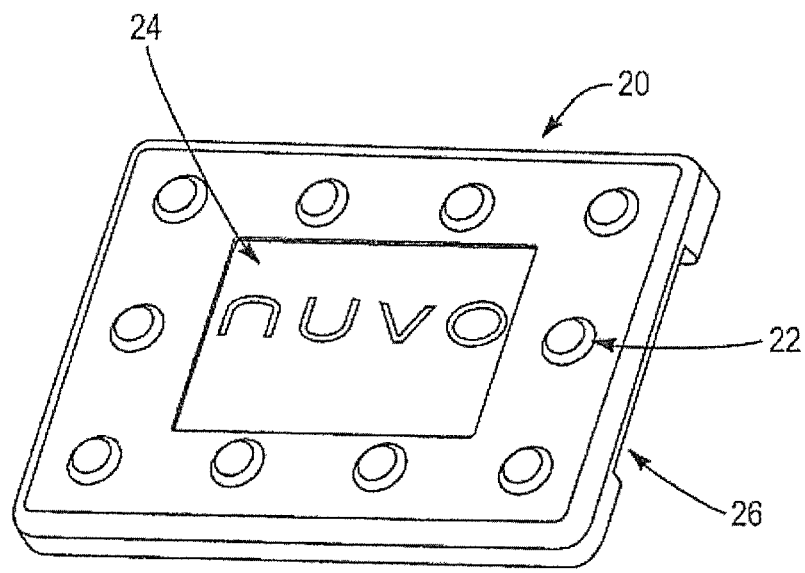
FIG. 2 illustrates a perspective top view of a representative container lid in accordance with an embodiment of the present invention.

With reference now to FIG. 2, a perspective top view of another representative container lid in accordance with an embodiment of the present invention is illustrated. In FIG. 2, lid 20 includes one or more protrusions 22 that are configured to be received by one or more corresponding receiving portions of a bottom surface of a base, such as receiving portions 50 of base 40 (illustrated in FIG. 5). Additionally, lid 20 includes a label or marking 24 and handles 26.

Figure 3:
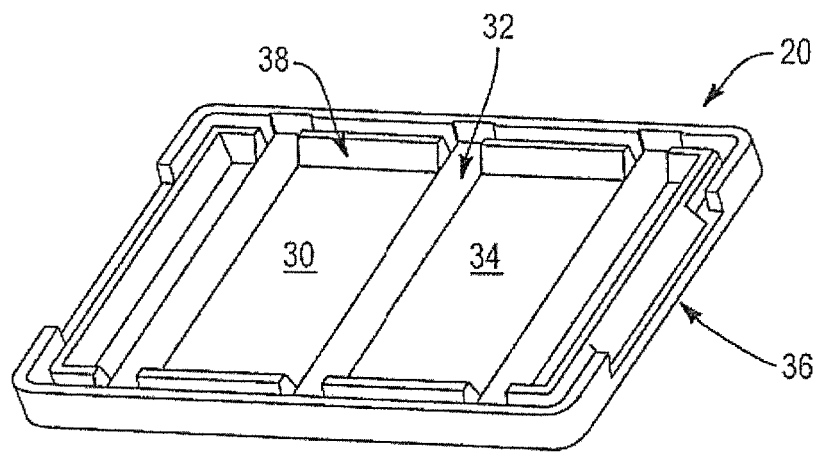
FIG. 3 illustrates a perspective bottom view of a representative container lid in accordance with an embodiment of the present invention.

With reference to FIG. 3, a bottom perspective view is provided of lid 20. At least some embodiments include one or more vents that allow heat to dissipate. In the illustrated embodiment, channel 32 is created between structures 30 and 34 to enable the dissipation of heat at channel 32. Additionally, in the illustrated embodiment, handle 26 (FIG. 2) includes surface 36, which also enables the dissipation of heat.

Figure 4:
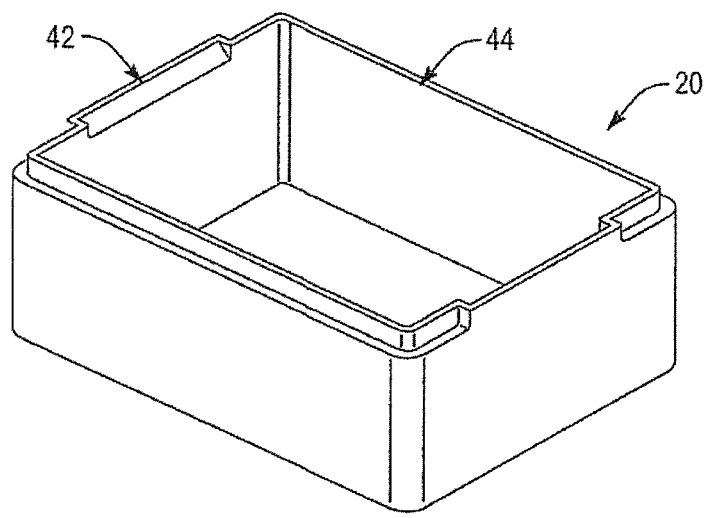
FIG. 4 illustrates a perspective top view of a representative container in accordance with an embodiment of the present invention.

In FIG. 4, a perspective top view of a representative container 40 is illustrated, wherein container 40 includes surface 42, which corresponds to surface 36 (FIG. 3) to enable the dissipation of heat. Additionally, lip 44 is configured to receive lid 20, and enables heat to dissipate.

Figure 5:
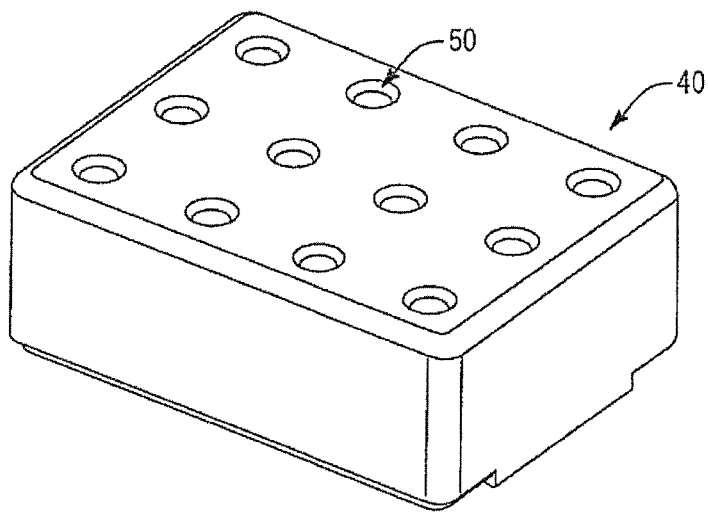
FIG. 5 illustrates a perspective bottom view of a representative container in accordance with an embodiment of the present invention.

As provided above, FIG. 5 illustrates a perspective bottom view of a representative container 40 that includes receiving portions 50, which are configured to selectively receive corresponding protrusions of a container lit to enable the containers to interlock.

While the containers illustrated in FIGS. 1-5 illustrate containers that interlock at their top and bottom surfaces, those skilled in the art will appreciate that other embodiments of the present invention embrace an interlocking nature on any surface of the containers.

Figure 6:
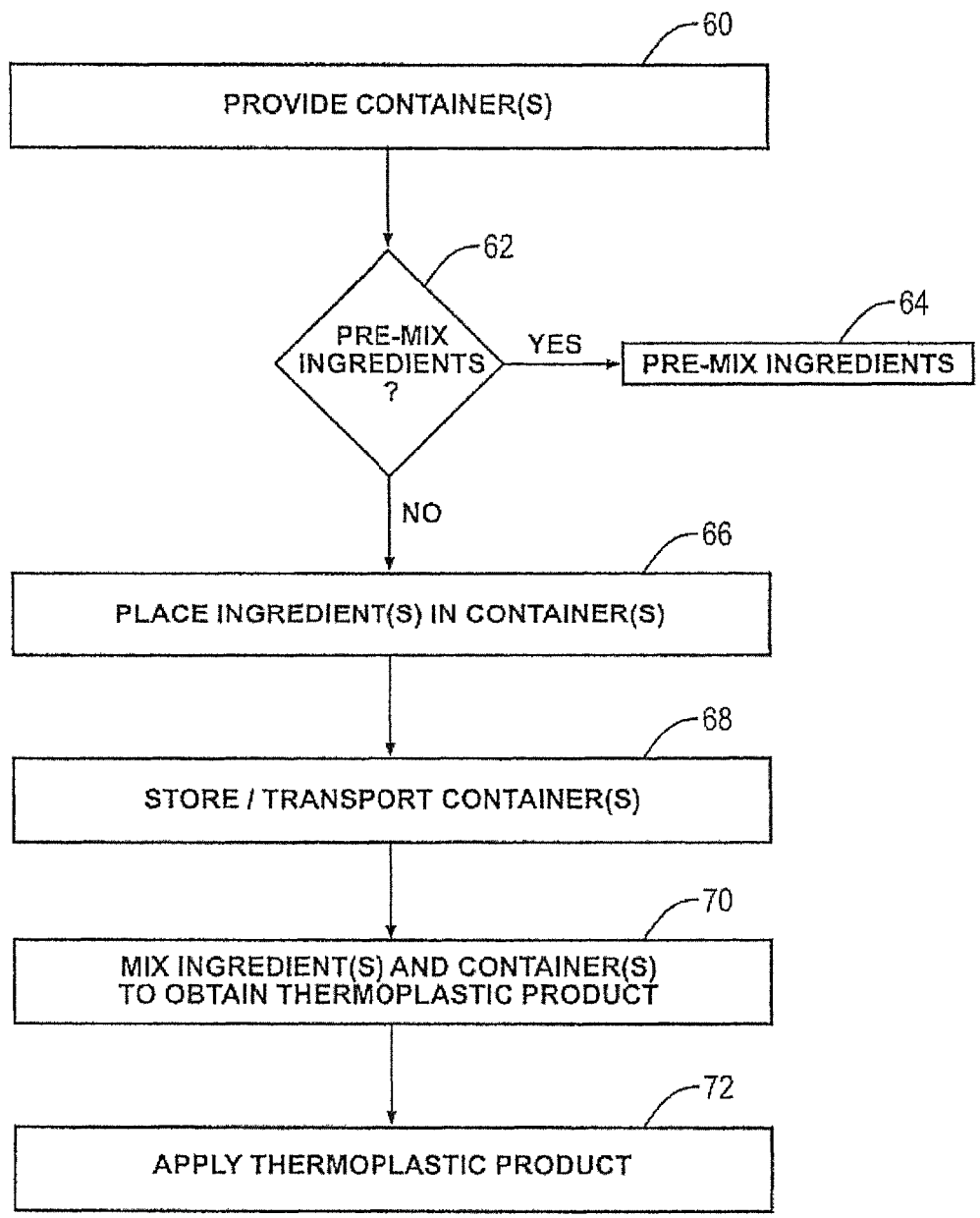
FIG. 6 illustrates a representative embodiment of the present invention for obtaining a thermoplastic product for use.

With reference now to FIG. 6, a representative method for obtaining a thermoplastic product for use is provided in accordance with an embodiment of the present invention. In FIG. 6, execution begins at step 60, wherein a container is provided that is configured to receive one or more ingredients for a thermoplastic product. At decision block 62, a determination is made as to whether or not the ingredients to be placed into the container are to be pre-mixed. In some embodiments, a pre-mixing process occurs in advance of placing the ingredients into the container. In one embodiment, the pre-mixing process includes heating and mixing various ingredients.

If it is determined at decision block 62 that ingredients are to be pre-mixed, execution proceeds to step 64, where the pre-mixing takes place. The pre-mixed ingredients are then placed into the container at step 66. Alternatively, if it is determined at decision block 62 that the ingredients are not to be pre-mixed, execution proceeds directly to step 66.

At step 66, one or more ingredients for a thermoplastic product are placed into a container. The containers are then used to store and transport the ingredients. At a mixing site, such as at a job or other site, one or more containers with the ingredients therein are mixed together at step 70 to obtain a thermoplastic product. In at least some embodiments, the process for mixing includes providing heat to mix the ingredients, including at least a portion of the containers. In at least some embodiments, the entire containers are included in the mixing process to obtain the thermoplastic product. At step 72, the thermoplastic product is then applied for use.

Accordingly, the applied thermoplastic product includes at least a portion of the container and/or packaging that was used to store and/or transport thermoplastic product ingredients prior to application of the combined mixture onto a surface. Application of the thermoplastic product to a surface includes providing a thermoplastic product container having a volume of thermoplastic product; heating and mixing the thermoplastic product ingredient container and the volume of thermoplastic product ingredients to produce a volume of a thermoplastic product mixture; and applying the thermoplastic product mixture to the surface.

In another representative embodiment for applying a thermoplastic product to a surface, the various raw materials are obtained and then combined. By way of example, the raw materials are weighed and then transferred into a mixing tank. The materials are then heated to the appropriate temperature for mixing (e.g., 300° F.-430° F. or another temperature). The ingredient mixture is then cooled to a packaging temperature (e.g., 200°-215° F. or another temperature).

Examples of raw materials for inclusion into a thermoplastic product include rubber and plastic thermoplastic elastomers, Polybutadienes, Styrene Butadiene Styrene Block Copolymers, Styrene Isobutyl Butadiene Copolymer, Styrene Ethylene Butadiene Styrene, Hydrogenated Styrene Butadiene Styrene, Styrene Butadiene Rubber, Nitrile Rubber, Ethylene Butadiene Styrene, Synthetic Latex, Latex, Natural Rubber, Olefins, Polyolefins, Polyethylene, High Density Polyethylene, Low Density Polyethylene, Linear Low Density Polyethylene, Polypropylene, High Density Polypropylene, Low Density Polypropylene, Ethylene Propylene Copolymer, Polystyrene, High Density Polystyrene, Low Density Polystyrene, High Impact Polystyrene, Polybutylene, Polyisobutylene, Perlite Microspheres, Ceramic Microspheres, Talc, Glass, Asphalt Cement, Light Oils, Vacuum Gas Oils, Ground Tire Rubber, Roofing Asphalt, Kaolin, Limestone, Sodium Bentonite, Sulfur, any grade of asphalt, one or more oils, one or more polymers, styrene butadiene styrene block copolymers, mineral fillers, aggregates, fiber, roofing asphalt, tar sands, Trinidad lake asphalt, Great Salt Lake oil, plasticizers, anti-strip agents, or other materials. Any of such materials may be comprised in the container.

The ingredient mixture is then transferred into packaging containers, such as the sealant packaging or containers discussed herein. By way of example, the process of transferring can include: (i) pumping the ingredient mixture through a colloid mill to a mix tank and/or packaging tank; (ii) adding measured amounts of ground talc, ground tire rubber, and ground sodium bentonite to the mixture coming from the mix tank; (iii) allowing the packaging tank to agitate; (iv) adding a measured amount of ground limestone while agitating; and (v) packaging the resulting mixture. The packaged mixture may be cooled to a packaging temperature (e.g., 180 F-250 F or another temperature) or an ambient temperature. The containers are then stacked and transported, such as to a job site. The packaged ingredients and corresponding sealant container(s) are combined to form a thermoplastic product. In at least some embodiments, the combination of the mixture and container includes melting the mixture and/or packaging, and creating the thermoplastic product, which is applied to one or more surfaces.

Figure 7:
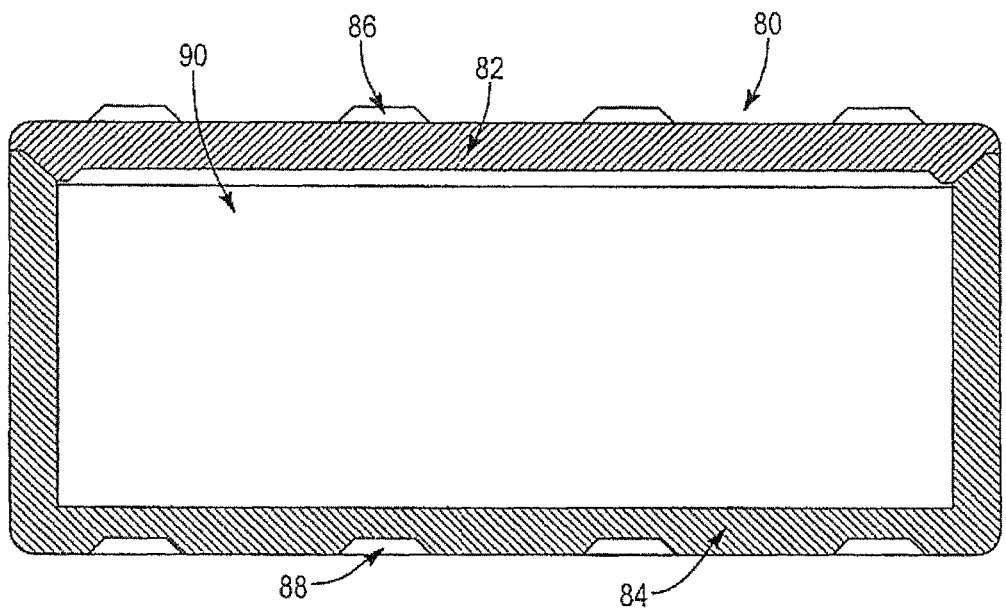
FIG. 7 illustrates a representative embodiment of the present invention, wherein a container includes one or more pre-mixed ingredients, wherein the container and the pre-mixed ingredients are for inclusion into the thermoplastic product.

With reference now to FIG. 7, a representative embodiment of the present invention is illustrated, wherein a container 80 includes one or more pre-mixed ingredients, and wherein the container and the pre-mixed ingredients are for inclusion into the thermoplastic product. In FIG. 7, container 80 includes a lid 82 and a base 84, wherein lid 82 comprises one or more protrusions 86 and base 84 comprises one or more receiving portions 88. Protrusions 86 are configured to be received into corresponding receiving portions of another container to enable an interlocking nature of the containers. Container 80 includes pre-mixed ingredients 90 for storage and transportation of the pre-mixed ingredients 90.

Figure 8:
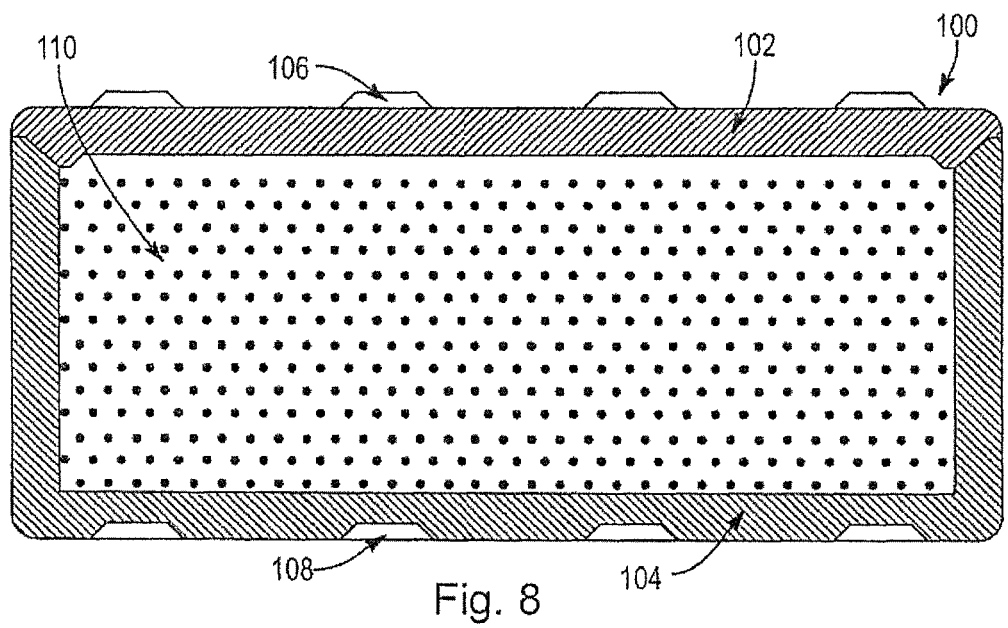
FIG. 8 illustrates a representative embodiment of the present invention, wherein a container includes one or more raw ingredients, wherein the container and the raw ingredients are for inclusion into the thermoplastic product.

With reference now to FIG. 8, a representative embodiment of the present invention is illustrated, wherein a container 100 includes one or more raw ingredients, and wherein the container and the raw ingredients are for inclusion into the thermoplastic product. In FIG. 8, container 100 includes a lid 102 and a base 104, wherein lid 102 comprises one or more protrusions 106 and base 104 comprises one or more receiving portions 108. Protrusions 106 are configured to be received into corresponding receiving portions of another container to enable an interlocking nature of the containers. Container 100 includes raw ingredients 110 for storage and transportation of the raw ingredients 110.

Figure 9:
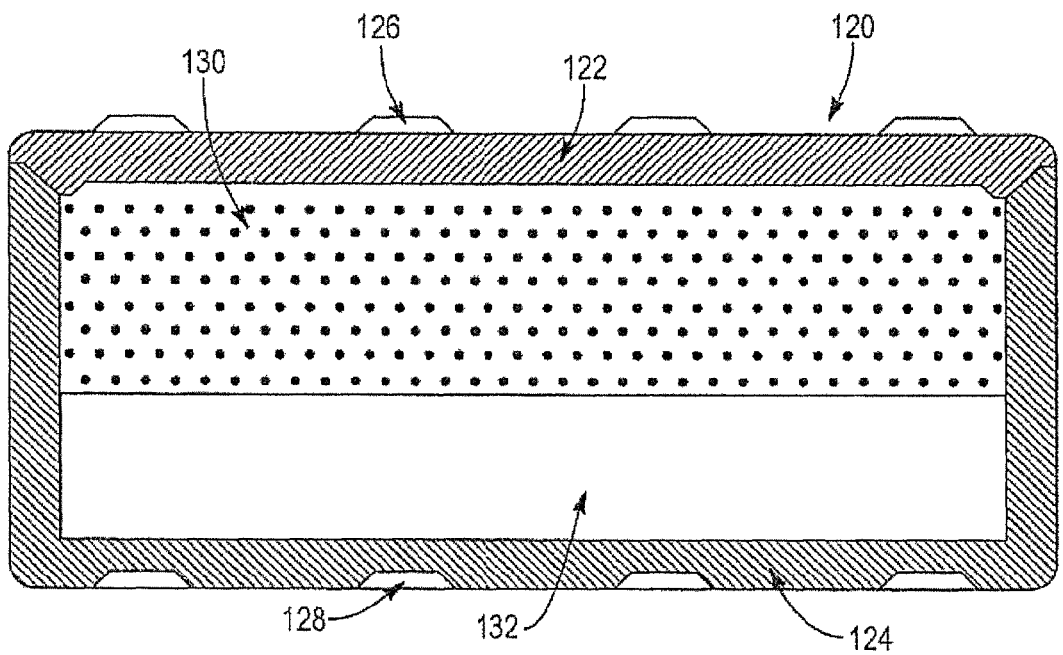
FIGS. 9-10 illustrate representative embodiments of the present invention, wherein a container includes one or more pre-mixed ingredients and one or more raw ingredients, wherein the container, the pre-mixed ingredients and the raw ingredients are for inclusion into the thermoplastic product.

With reference now to FIG. 9, a representative embodiment of the present invention is illustrated, wherein a container 120 includes one or more pre-mixed ingredients 132 and one or more raw ingredients 130, and wherein the container 120, the pre-mixed ingredients 132 and the raw ingredients 130 are for inclusion into the thermoplastic product. In FIG. 9, container 120 includes a lid 122 and a base 124, wherein lid 122 comprises one or more protrusions 126 and base 124 comprises one or more receiving portions 128. Protrusions 126 are configured to be received into corresponding receiving portions of another container to enable an interlocking nature of the containers. Container 120 includes pre-mixed ingredients 132 and raw ingredients 130 for storage and transportation of pre-mixed ingredients 132 and raw ingredients 130.

Figure 10:
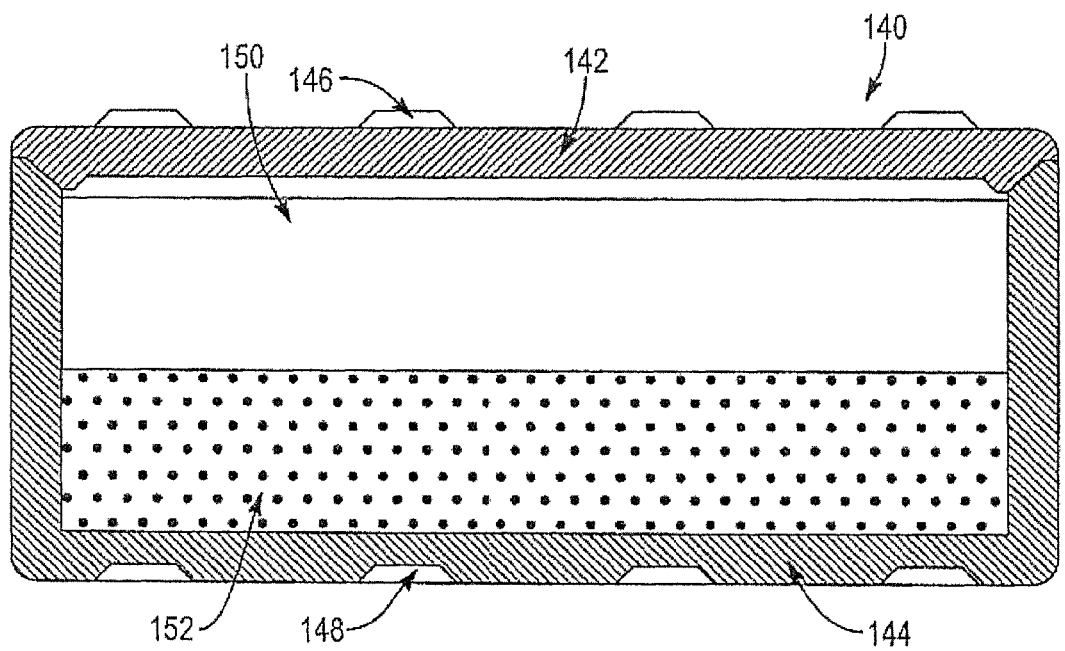

With reference now to FIG. 10, a representative embodiment of the present invention is illustrated, wherein a container 140 includes one or more pre-mixed ingredients 150 and one or more raw ingredients 152, and wherein the container 140, the pre-mixed ingredients 150 and the raw ingredients 152 are for inclusion into the thermoplastic product. In FIG. 10, container 140 includes a lid 142 and a base 144, wherein lid 142 comprises one or more protrusions 146 and base 144 comprises one or more receiving portions 148. Protrusions 146 are configured to be received into corresponding receiving portions of another container to enable an interlocking nature of the containers. Container 140 includes pre-mixed ingredients 150 and raw ingredients 152 for storage and transportation of pre-mixed ingredients 150 and raw ingredients 152.

Figure 11:
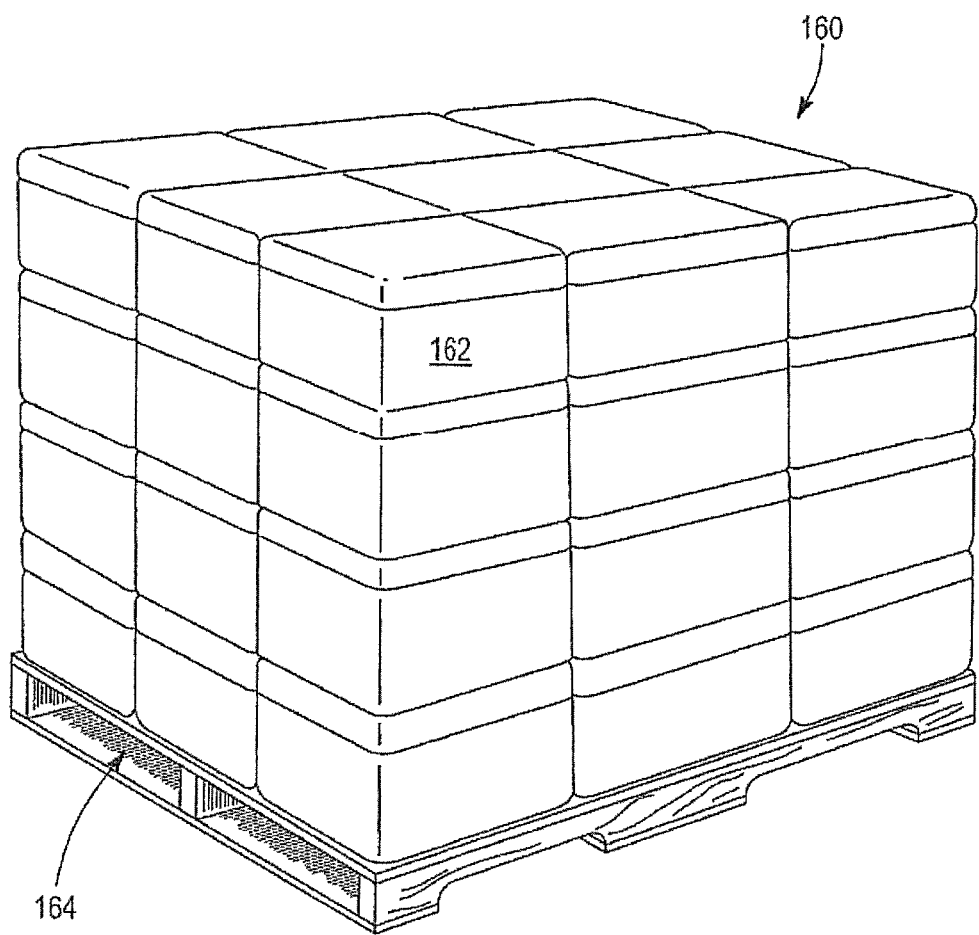
FIG. 11 illustrates a representative embodiment for stacking containers in accordance with the present invention.

With reference now to FIG. 11, a representative stack 160 of interlocking containers 162 on a pallet 164 is illustrated. Embodiments of the present invention embrace a variety of manners for interlocking the containers to strengthen the structural integrity of the individual containers and the pallet. In some embodiments, the interlocking features are located on one or more surfaces of a container to enable two contiguous containers to be interlocked or otherwise coupled. The containers are stacked, for example, for storage and/or transportation.

As provided herein, at least some embodiments embrace packaging that comprises inter-receiving and/or interlocking containers that increase stability when stacked. For example, reference is made to FIGS. 12-18, which provide views of representative containers that are configured to be interlocking with other corresponding containers.

Figure 12:
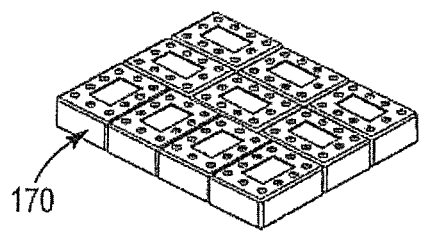
FIGS. 12-18 illustrate another representative embodiment for stacking containers in accordance with the present invention.
Figure 13:
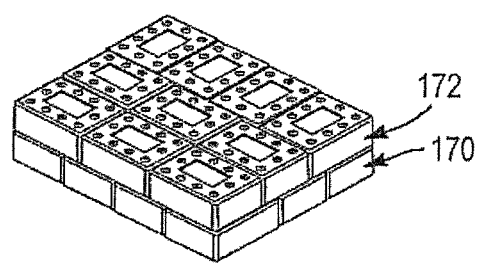
Figure 14:
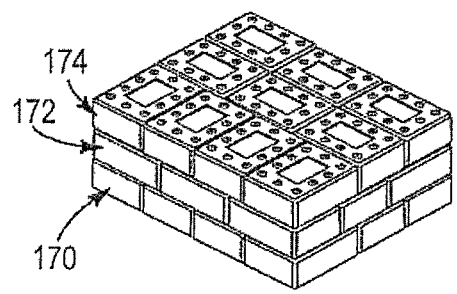
Figure 15:
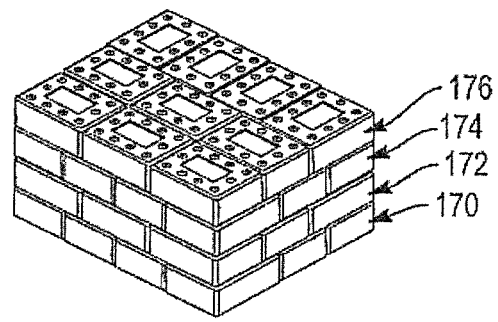
Figure 16:
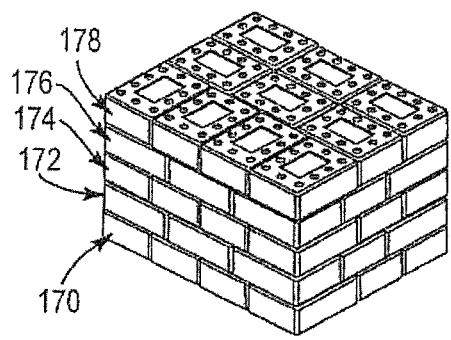
Figure 17:
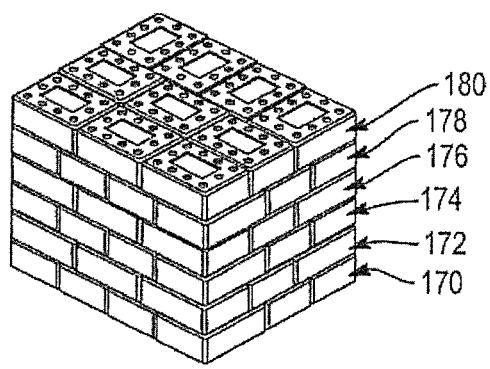
Figure 18:
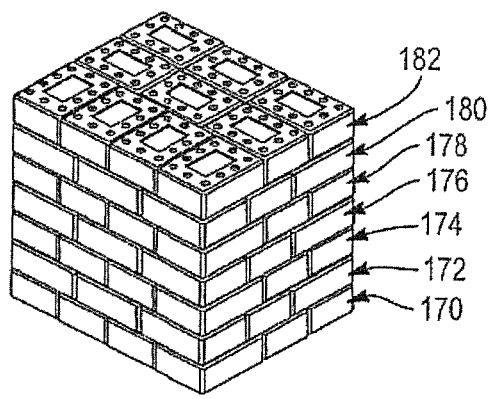

Specifically, FIGS. 12-18 illustrate another representative embodiment for stacking containers in accordance with the present invention, wherein FIG. 12 illustrates layer configuration 170, FIG. 13 illustrates layer configuration 172, FIG. 14 illustrates layer configuration 174, FIG. 15 illustrates layer configuration 176, FIG. 16 illustrates layer configuration 178, FIG. 17 illustrates layer configuration 180, and FIG. 18 illustrates layer configuration 182. Those skilled in the art will appreciate that embodiments of the present invention embrace a variety of layer configurations for stacking containers. In other embodiments, two or more contiguous layer configurations are identical. Such structure can provide increased strength.

Figure 19:
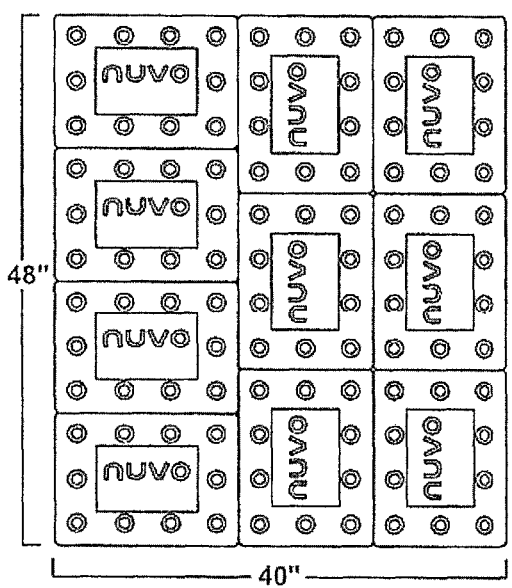
FIGS. 19-20 illustrate top views of representative embodiments for stacking containers.
Figure 20:
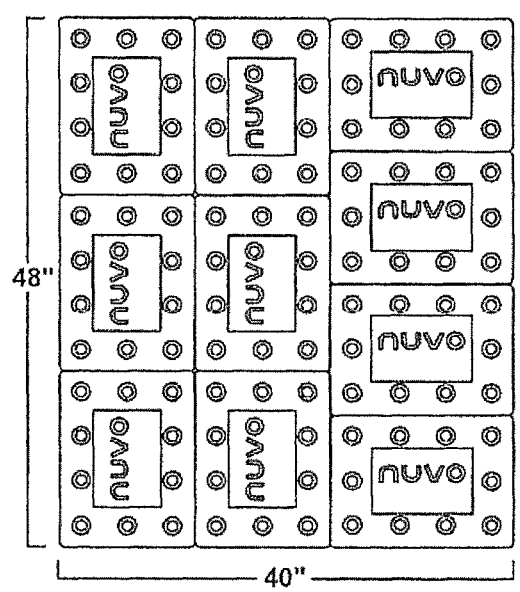
Figure 21:
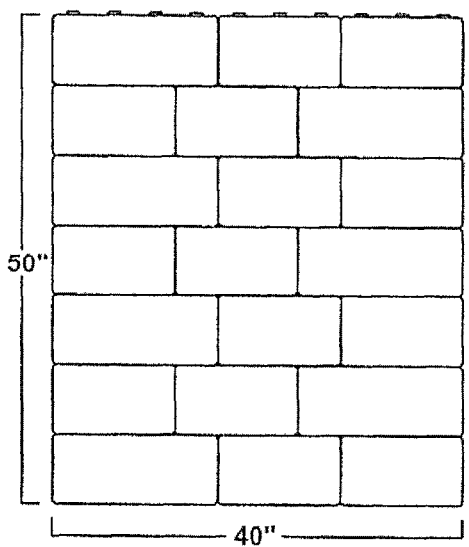
FIGS. 21-22 illustrate side views of representative embodiments for stacking containers.
Figure 22:
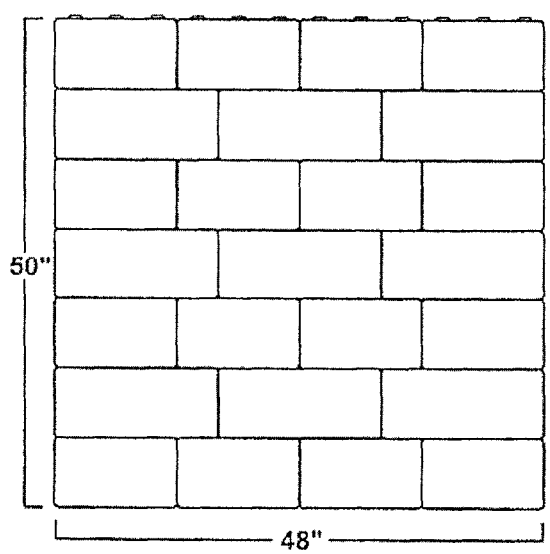

With reference now to FIGS. 19-20, top views of representative layer configurations are illustrated in accordance with some embodiments of the present invention for stacking containers. In FIGS. 21-22, side views of representative embodiments for stacking containers are illustrated. While the illustrated embodiments provide respective dimensions of 40" wide by 50" high, and 48" wide by 50" high, those skilled in the art will appreciate that other embodiments of the present invention embrace dimensions that are smaller or larger than the dimensions provided in the illustrated embodiments.

The following provides representative weight percentage ranges of ingredients for inclusion into a representative thermoplastic product of the present invention:

| Raw Material | Weight % Range |
| --- | --- |
| Asphalt Cement | 49%-77% |
| Light Oils | 0%-23% |
| Styrene butadiene Styrene block copolymers | 0%-6% |
| Styrene butadiene Rubber | 0%-4% |
| Poly Olefins | 0%-3% |
| Ground Tire Rubber | 0%-22% |
| Ground Limestone | 0%-34% |
| Ground Talc | 0%-8% |
| Ground Sodium Bentonite | 0%-9% |
| Anti Strip Agents | 0%-1% |
| Plasticizers | 0%-1% |

Those skilled in the art will appreciate that the raw materials and corresponding formula percentage ranges are representative only. Accordingly, embodiments of the present invention embrace the addition of other raw materials and/or other percentage ranges.

As provided herein, at least some embodiments of the present invention embrace a package and packaging system wherein the entire package becomes incorporated into the thermoplastic product upon heating and mixing, and wherein the package contributes structurally to the containment of ingredients and the structural integrity of an individual container and the entire pallet. The packaging is resistant to the effects of weather, ozone, free radicals, and ultraviolet light. The thermoplastic product can be used in conventional equipment, and waste is eliminated. The thermoplastic product is cleaner, as the container prevents contamination. Additionally, embodiments of the present invention save time in preparing the thermoplastic product for application and eliminate waste.

The following provides representative weight percentage ranges of ingredients for inclusion into various thermoplastic products of the present invention:

| Raw Material | Weight % Range |
| --- | --- |
| Asphalt Cement | 0-100% |
| Light Oils | 0-95% |
| Styrene butadiene Styrene block copolymers | 0-20% |
| Styrene butadiene Rubber | 0-20% |
| Poly Olefins | 0-100% |
| Ground Tire Rubber | 0-50% |
| Ground Limestone | 0-70% |
| Ground Talc | 0-70% |
| Ground Sodium Bentonite | 0-15% |
| Anti Strip Agents | 0-2% |
| Plasticizers | 0-5% |
| Roofing Asphalt | 0-100% |
| Tar Sands | 0-100% |
| Trinidad lake asphalt | 0-100% |
| Great Salt Lake oil | 0-70% |
| Polyester fiber | 0-30% |
| Light weight aggregates (specific gravity 1.0 to 2.0 g/ml) | 0-80% |
| Medium light weight aggregates (specific gravity 2.0 to 3.0 g/ml) | 0-80% |
| Perlite microspheres | 0-80% |
| Calcium Oxide | 0-70% |
| Magnesium Oxide | 0-70% |
| Titanium dioxide | 0-80% |
| Aluminum Metal Flake | 0-90% |
| Carbon black | 0-50% |
| Polystyrene | 0-20% |

Those skilled in the art will appreciate that the raw materials and corresponding formula percentage ranges are representative only. Accordingly, embodiments of the present invention embrace the addition of other raw materials and/or other percentage ranges, particularly for roofing asphalt, asphalt cement, waterproofing membranes, and hot melt adhesives, as well as sealants which contain fiber and aggregate or no asphalt at all.

In some embodiments, the packaging comprises a durable container that is configured to receive a volume of one or more ingredients. The durable container is used to hold the one or more ingredients during storage and/or transportation, and contributes to the structural stability of an individual container and a stack of containers (i.e., a pallet or partial pallet of containers). In further implementations, the durable container is interlocking with other durable containers, which further contributes to the structural stability of a stack of containers.

In some embodiments, the durable container is a thermoplastic or is capable of becoming part of a thermoplastic product. It can be molded, formed, or created through a process to be any shape or size, to be conducive for the packaging product or specific application requirements or equipment needs. The container is durable and structural by itself and/or as part of a larger combination of other containers that are stacked on a pallet or in another shipping method. In some embodiments, the container remains rigid and is not structurally compromised at any ambient temperature where the container would be shipped or stored. In some embodiments, expanded polystyrene polymer or any other expanded polymer is used. In one embodiment, linear low density polyethylene plastic buckets or low density polyethylene plastic buckets are used as the containers.

In some embodiments, the durable container is weight-bearing. Further, at least some containers comprise a polymer or other material that is pre-calculated to be used as an ingredient in the thermoplastic product mixture or material. Examples of such polymer materials include polystyrene, polypropylene, polyethylene, ethylene vinyl acetate, styrene butadiene styrene block copolymer, styrene butadiene rubber or another polymer material. In some implementations, the durable container comprises a plastic or plastic foam container which can be thermoplastic itself. In some embodiments, the durable container is solid or semi-solid at ambient temperatures, and is heated and mixed with other ingredients to create the thermoplastic product.

Accordingly, at the job site, one or more containers with ingredients therein may be combined to obtain a thermoplastic product for application onto one or more surfaces. Therefore, the applied thermoplastic product includes the container that was used to store and/or transport the ingredients prior to mixture of the thermoplastic product.

In some embodiments, generation of a thermoplastic product for application to a surface includes providing a thermoplastic product ingredient container having a volume of thermoplastic product ingredients; mixing the thermoplastic product ingredient container and the volume of thermoplastic product ingredients to produce a volume of a thermoplastic product; and applying the thermoplastic product mixture to the surface. In at least some implementations, the mixing of the thermoplastic product ingredient container and the volume of thermoplastic product ingredients to produce a volume of a thermoplastic product comprises heating the mixture. In one implementation, the mixture is heated to about 250° to 450° F. However, other embodiments embrace other temperature ranges.

While the methods and processes of the present invention have proven to be particularly useful in the area of pavement crack sealants, joint sealants, other sealants, waterproofing membranes, roofing asphalt, paving grade asphalt cement, and hot melt adhesives, those skilled in the art will appreciate that the methods and processes of the present invention can be used in a variety of different applications and in a variety of different areas of manufacture to yield a thermoplastic product for application to a surface, wherein the thermoplastic product includes its storage and/or transportation container as an ingredient thereof when applied to a surface. Examples include pavement maintenance (e.g., asphalt crack sealants, concrete joint sealants, bridge deck membranes, bridge expansion joint sealants, wide crack sealants, pothole patching products, concrete spall repair products, concrete patching products, paving joint adhesives, traffic loop detector sealants, pavement marker adhesives, colored sealants and products, hot applied rubberized chip seal binders, chip seal binder additives, hot applied seal coats, etc.), roofing (e.g., shingle tab adhesives, shingle lamination adhesives, waterproofing membranes, polymer roofing asphalt, polymer modified bitumen, blown roofing asphalt, planter box membranes, rolled roofing seam adhesives, ice and snow shields, vertical surface adhesives, vertical surface repair, perforation repair, white hot applied waterproofing membranes and top coatings, sliver hot applied waterproofing membranes and top coatings, gray hot applied waterproofing membranes and top coatings, etc.), paving (e.g., paving grade asphalt cement, polymer modified paving asphalt cement, paving additives and modifiers, etc.) gaskets, thermoplastic paints, hot melt adhesives, extruded rubber products, pre-weighed polymers, and any process that uses batch inclusion packaging for raw materials.

Embodiments of the present invention embrace a container that protects the ingredients contained therein from the weather and from water, and is less likely to leak and spill. The container does not require removal, as it is just included into the melter/applicator when creating the thermoplastic product. The container allows the ingredients to be packaged in any convenient shape or size for any particular purpose.

Thus, as discussed herein, the embodiments of the present invention embrace thermoplastic products. In particular, embodiments of the present invention relate to systems and methods for providing a thermoplastic product that includes packaging therefor, wherein the packaging is used to contain one or more ingredients of the thermoplastic product during storage and/or transportation, and wherein the packaging itself is an ingredient for inclusion into the thermoplastic product.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A package configured to form a thermoplastic mixture, the package comprising:
   a non-asphalt, polymer container comprising an expanded polymer; and
   a raw material disposed within the non-asphalt, polymer container, wherein the raw material is combinable with the non-asphalt, polymer container to provide a sealant composition.

2. The package of claim 1, wherein the package comprises a vent to dissipate heat from an interior of the non-asphalt, polymer container.

3. The package of claim 1, wherein the non-asphalt, polymer container comprises a base portion comprising the expanded polymer.

4. The package of claim 1, wherein non-asphalt, polymer container comprises an expanded polystyrene.

5. The package of claim 1, wherein a melting point of the non-asphalt, polymer container is greater than a melting point of the raw material.

6. A package comprising:
   a polymer container comprising 0-30% asphalt and an expanded polymer; and
   a first ingredient for inclusion in a thermoplastic product, the first ingredient being disposed within the polymer container, wherein the first ingredient and the polymer container are configured to be melted and mixed together to provide the thermoplastic product.

7. The package of claim 6, wherein the thermoplastic product comprises a hot melt adhesive.

8. The package of claim 6, wherein the package comprises a vent to dissipate heat from an interior of the polymer container.

9. The package of claim 6, wherein the polymer container comprises a first portion having an internal volume that receives the ingredient, and wherein the package further comprises a lid configured to couple with the first portion of the polymer container.

10. The package of claim 9, wherein the lid defines a channel to dissipate heat from the polymer container.

11. The package of claim 10, wherein the lid comprises a handle.

12. The package of claim 6, further comprising a second ingredient disposed within the polymer container, wherein the first and second ingredients have been heated and mixed together before being disposed in the polymer container.

13. The package of claim 6, wherein the first ingredient comprises a raw ingredient and wherein multiple pre-mixed ingredients are also disposed within the polymer container.

14. The package of claim 13, wherein the container comprises an interior compartment with an opening, and wherein the premixed ingredients are disposed closer to the opening than the first ingredient.

15. The package of claim 6, wherein the container is configured such that a single side of the container is able to at least one of (i) interlock with and (ii) inter-receive multiple other containers simultaneously.

16. A package comprising:
a polymer container comprising asphalt and an expanded polymer; and
a first ingredient for inclusion in an asphalt product, wherein the first ingredient and the polymer container are configured to be melted and mixed together to provide the asphalt product.

17. The package of claim 16, wherein the package comprises a vent to dissipate heat from an interior of the polymer container.

18. The package of claim 16, wherein the polymer container comprises a first portion having an internal volume that receives the first ingredient, and wherein the package further comprises a lid configured to couple with the first portion of the polymer container.

19. The package of claim 16, wherein the first ingredient comprises a raw ingredient and wherein multiple pre-mixed ingredients are also disposed within the polymer container.

20. The package of claim 16, further comprising a second ingredient disposed within the polymer container, wherein the first and second ingredients have been not heated and mixed together before being disposed in the polymer container.

* * * * *